Jan. 27, 1970  C. H. TROTTER, JR., ET AL  3,491,935
METHOD OF FORMING A PEELABLE SEAL
Filed Aug. 8, 1966  2 Sheets-Sheet 2

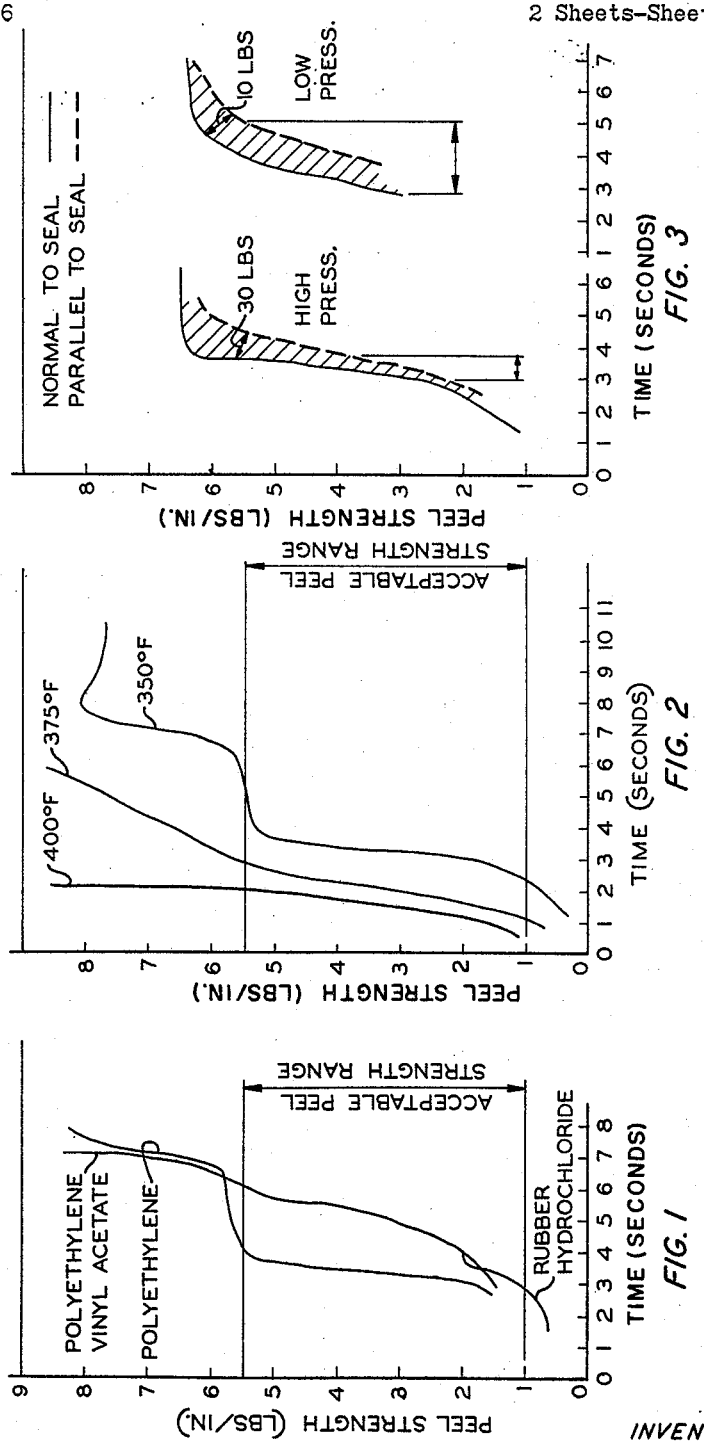

INVENTORS
C. H. TROTTER, JR.
S. A. KILE
BY
Young & Quigg

ATTORNEYS

United States Patent Office 3,491,935
Patented Jan. 27, 1970

3,491,935
METHOD OF FORMING A PEELABLE SEAL
Claude H. Trotter, Jr., Southfield, Mich., and Stephen A. Kile, Bartlesville, Okla., assignors to Phillips Petroleum Company, a corporation of Delaware
Filed Aug. 8, 1966, Ser. No. 570,898
Int. Cl. C09j 5/02; B32b 31/26
U.S. Cl. 229—3.5                   6 Claims

ABSTRACT OF THE DISCLOSURE

A peelable seal is made between (1) a substrate which can be either polypropylene, high density polyethylene, or a copolymer of ethylene and up to 5 weight percent of a higher mono-1-olefin and (2) a cover material which can be either an ethylene vinyl acetate copolymer, low density polyethylene, or a rubber hydrochloride. The cover material must melt at a lower temperature than the substrate and must be compatible with the substrate to the extent that when the two materials are pressed together under sufficient heat to melt just the cover material, a seal will be formed which will not leak and yet which will easily peel off.

---

Figure 4:
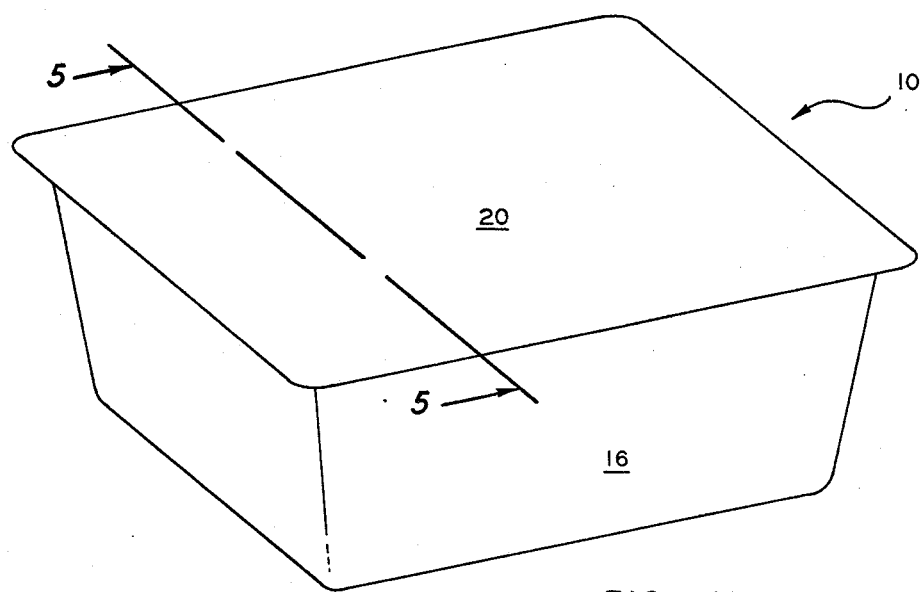

This invention relates to a method of forming a peelable seal for containers. In another aspect, this invention relates to a method of forming a peelable seal between certain thermoplastic materials by using heat input.

Packages of thermoplastic materials have been used extensively in various industries for dispensing a wide variety of both flowable and nonflowable materials. These packages consist of containers that have been sealed in various ways, and recently there has been a great need for containers sealed with thin-wall sealing material that is either punctured or removed by the consumer to get at the contents of the sealed package. This thin-wall sealing material may be either transparent to let the consumer inspect the contents of the package before purchase, or a laminated foil, or merely a thin sheet of material with a paper label attached. These type containers have special utility as a method of dispensing food products. The easiest way to provide for this type of container is to create a seal of low adherency value between the periphery of the container and a thin-wall sheet of sealing or closure material that can be peeled off by the consumer, but has enough resistance to peel that the seal will not leak under normal handling. In this manner, the package may be opened by merely pulling on the edge of the closure material or a tab provided on this enclosure material and peeling the closure material back from the container and thereby exposing the contents of the container, or if desired, the container material itself can be a sheet material so that the package may be opened by merely pulling the closure material and the container material in opposite directions. This low adherency type of seal has been made by the utilization of various adhesive coating materials that will provide the needed low adherency values when placed between the closure material and the periphery of the container, but this requires special machinery for coating the adhesive materials and for sealing the container by heat and/or pressure. Therefore, there is a need for an efficient, peelable heat seal between two materials that will provide the needed low adherency values which will facilitate the peeling operation without the necessity of using the conventional adhesive and semi-adhesive coating materials. However, attempts to heat seal a closure material to a container has generally resulted in the adherency extremes of a weld or fusion seal of very high adherency value or no seal at all. The weld or fusion seal results when chemically compatible materials are brought to their melting points simultaneously and generally under pressure. The resulting seal will not fail upon application of external pressure before the material adjacent to the seal area fails, or in case of lamination, before adhesive failure of the laminated material and the substrate. Also, upon the heating of two chemically incompatible materials, it has been generally found that no seal at all, or at best, a very leaky seal results. Therefore, no efficient peelable seal has been made to date by merely heating two thermoplastic materials while in intimate contact.

However, we have discovered that certain materials will form a peelable heat seal through the utilization of the principal of differential fusion.

Therefore, an object of this invention is to provide a method of forming a peelable seal by heating two selected thermoplastic materials while in intimate contact, the first having a lower softening point than the other, the said first material fusing and securing itself to the second material and therby forming a peelable seal without fusing the second material. Another object of this invention is to provide a method of forming a peelable heat seal between a closure material selected from a group containing vinyl acetate copolymers, low density polyethylene, and rubber hydrochloride, and a container material of high density polyethylene, polypropylene, or copolymers of ethylene and other 1-olefins such as propylene, 1-butene, 1-pentane, 1-hexene, 1-heptene, 1-octene and 1-nonene. Other objects of this invention will in part be obvious and in part hereinafter pointed out.

According to the invention, peelable heat seals are made between certain materials by the utilization of differential fusing. In this manner, a peelable seal results where one material fuses before the other, and upon fusing, the material functions as an adhesive and secures itself to its unfused companion. This differential fusing can be explained by establishing a relationship between the heat transfer mechanism, the specific heats of the materials, and their melting points. The heat transfer mechanism is explained mathematically as follows: $\Delta Q/\Delta T = kD\Delta T$.

$\Delta Q/\Delta T$, the amount of feed (B.t.u.) per unit time is a function of $k$, the material's heat transfer capability; D, the material's thickness, and T, the temperature difference between the sealing bar and the innerface of the material being sealed. The $k$ is dependent on the nature of the material or materials being sealed. The other variables are dependent on the material. As the temperature increases, the time interval required for fusion or weld seal becomes smaller, and this is also true with regard to a peelable seal. In the sealing operation, the heat flows through the closure material from a sealing die, and as this heat flows, the closure material becomes hot. The rate of heating depends upon the material's specific heat. A high specific heat means a slow rate of heating and a high softening point. The lower the specific heat, the faster the material will reach its fusion point where it can function as an adhesive for peelable seal purposes. During the sealing of the container, the temperature of the surface of the container next to the closure material increases at an accelerated rate, and therefore, approaches the fusion point. Thus, materials with low softening points are necessary for closure materials, because these closure materials must heat up and melt before the container material; otherwise, a weld seal will result.

FIGURE 1 is a graph showing the relationship of time to peel strength at a constant temperature for various cover materials; FIGURE 2 is a graph showing the relationship between time and peel strength for a particular cover material at various temperatures; FIGURE 3 is a graph showing the relationship between time and peel strength along directions parallel to, and normal to, the longitudinal direction of the seal; FIGURE 4 is a perspective view of a container in accordance with the instant invention; and FIGURE 5 is a cross section along section lines 5—5 of FIGURE 4.

Various common packaging films were secured and attempts were made to seal them. It was found that many of these packaging films such as polyvinyl chloride, polyvinyl acetate, cellophane, polystyrene, Mylar* (trademark for a condensation product of ethylene glycol and terephthalic acid), and polyvinylidene chloride did not yield a peelable seal with high density polyethylene or polypropylene. It was found however, that certain materials such as low density polyethylene, ethylene vinyl acetate copolymer and rubber hydrochloride would, in fact, yield a yieldable seal to high density polyethylene and polypropylene and copolymers of ethylene on other 1-olefins. The specific sealing films of this invention are polyethylene having a density of 0.91–0.93 m./cc. as determined by ASTM D–792, copolymers of ethylene and vinyl acetate which contain from 6–30 percent by weight vinyl acetate, rubber hydrochloride which can be either a natural or artificial chlorinated rubber such as the material sold under the trademark, "Pliofilm" by B. F. Goodrich. The specific container materials are polyethylene having a density of 0.94–0.97 gm./cc. as determined by ASTM D–792, polypropylene, and copolymers of ethylene and other 1-olefins such as propylene, 1-octene, and 1-nonene which contain up to 5 percent by weight of one of the said monoolefins. This result was entirely unexpected. FIGURE 1 is a plot of the peel strengths of an ethylene vinyl acetate copolymer having 22 percent by weight vinyl acetate, polyethylene with a density of 0.917 gm./cc. as determined by ASTM D–792 and Pliofilm (trademark for rubber hydrochloride) at a 350° F. sealing temperature, and a material thickness of 8 mils. It was determined that 1.1 lbs./in. and 5.5 lbs./in. are approximate limits of satisfactory peel strengths. These limits were set by manually peeling and judging whether the resistance would indicate a well sealed and protected product to a consumer. The dwell times were slightly above two seconds which is sufficient for mass production. The dwell time may be decreased for even faster production by raising the temperature. The effect of raising the temperature on the above-mentioned ethylene vinyl acetate copolymer closure film can be seen in FIGURE 2. The sealing range, denoted by the steepness of the slope of the plot, narrows as the temperature increases; however, the narrowing was not severe enough to make the materials too sensitive for most conventional sealing machines.

Consideration of factors other than the materials themselves is noteworthy at this point. FIGURE 3 illustrates the effect of pressure on an 8 mil thick ethylene vinyl acetate copolymer closure film during sealing and the direction of peel on the ultimate sealability of peel strengths of this material. Under higher sealing pressures, the closure material will be extruded or squeezed away from the area directly under the sealing bar. This extrusion can best be described as forming a bead around the seal area. The existence of this bead around the seal results in significantly greater peel strength when the seal is pulled normal to the seal than when it is peeled parallel to the seal. This variance of peel strength with the direction of the seal is of extreme value because stresses which may break the seal while the package is in transit or storage will occur normal to the seal which is the seal's strongest point; while efforts of the consumer to open the package will stress the seal at its weakest point (parallel to the seal). This situation is advantageous both from a shipping or storage and ease of opening standpoint. It results in a situation of having strength where strength is needed and weakness where weakness is desirable. Further examination of FIGURE 3 shows that a pressure of 30 p.s.i.g. will decrease the sealing time about 0.6 second which demands a compromise between strength of seal and machine time and temperature variances. The strength of a peelable seal is proportionate to the area over which the material is sealed. For example, a seal ½ inch wide will have greater peel strength than one ¼ inch wide. Therefore, for a peelable seal, the area seal should be the maximum feasible for a given container because it will provide additional resistance to rupture, and a strong peel to insure the consumer that the contents are securely packaged fresh.

Figure 5:
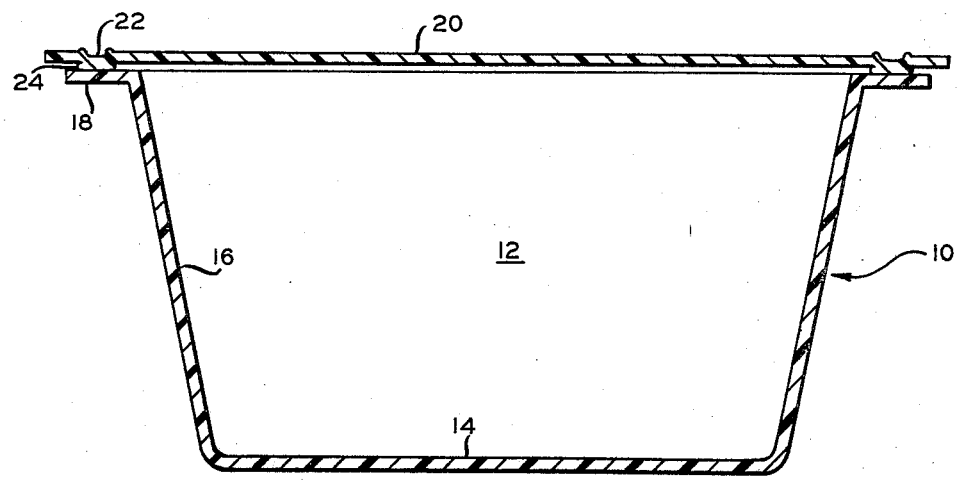

Referring now to FIGURES 4 and 5, there is shown a dispensing container in accordance with the instant invention designated generally by reference character 10, having a receptacle well 12, a base 14, and a wall 16 around the periphery of said base which extends upwardly therefrom. The upper portion of wall 16 has outwardly projecting lip 18. Sealed over the open end of container 10 is closure 20. The sealing area is designated by reference character 22. The bead formed by extrusion or squeezing away of the closure material under the high sealing pressures is designated by reference character 24.

Many types of sealing apparatus may be utilized for creating a thermal peelable seal. However, thermal sealers with a wide sealing area will be most satisfactory.

In order to better illustrate this invention, the following examples are provided.

EXAMPLE I

High density polyethylene containers having 0.95 mg./cc. as determined by ASTM D–792 density were utilized as containers. Eight mil thick films of polyvinyl chloride, polyvinyl acetate, cellophane, polystyrene, Mylar (trademark for a condensation product of ethylene glycol and terephthalic acid), and Saran (trademark for polyvinylidene chloride) were secured and each placed in intimate contact with a container of the above-mentioned polyethylene. Attempts were then made to seal the above-mentioned intimately contacted materials with a ¼ inch thermal sealing bar from range of 325° F. to 525° F. Differential melting was accomplished with the polyvinyl acetate, polystyrene, Mylar* and Saran; however, it was found that the above-mentioned films would not adhere to the high density polyethylene. The cellophane decomposed when placed in contact with the thermal sealing bar. Therefore, no peelable seals resulted.

EXAMPLE II

A container made of .95 density polyethylene was used in this run with a 4 mil thick sheet of ethylene vinylacetate film containing 22 percent by weight vinylacetate. It was found that a peelable seal was formed between the two substances in a temperature range of 325 to 375° F. at a dwell time of 1 second. It was also found that peelable seals resulted between the temperature of 375 to 425° F. and a dwell time of .7 second and between the temperature of 525 and 575° F. at a dwell time of .3 second.

EXAMPLE III

Eight mil films of ethylene vinylacetate copolymer containing 20 percent by weight vinyl acetate, and low density polyethylene having a density of 0.917 as determined by ASTM D–792 were placed in intimate contact with polyethylene containers of density 0.95 gm./cc. as determined by ASTM D–792 and heated with a thermal sealing bar. It was found that peelable seals resulted in all materials at temperature ranges from 325 to 400° F. at dwell times from less than 1 second to 7 seconds.

We claim:
1. A method of forming a container having an element attached by a peelable seal which comprises:
heating, while in direct and intimate contact along an area to be sealed, (1) a first normally solid sheet of material selected from the group consisting of ethylene vinyl acetate copolymer containing from 6 to 30 weight percent vinyl acetate, polyethylene having a density of from 0.91 to 0.93 g./cc. and rubber hydrochloride, and (2) a second normally solid material selected from the group consisting of polyethylene having a density of from 0.94 to 0.97 g./cc. polypropylene and a copolymer of ethylene and up to 5 weight percent of other mono-1-olefins, said heating being carried out for a time and temperature sufficient to fuse said first material along said contact area without fusing said second material; and simultaneously applying sufficient pressure to said first material along said area to be sealed during said heating so as to form a head of said first material around the periphery of said seal.

2. A method according to claim 1 wherein said first material is polyethylene of density from 0.91 to 0.93 g./cc. and said second material is polyethylene of density from 0.95 to 0.97 g./cc.

3. A method of forming a peelable seal which comprises:

heating, while in intimate contact along an area to be sealed, a sheet of normally solid ethylene vinyl acetate copolymer containing from 6 to 30 weight percent vinyl acetate, and a normally solid polyethylene having a density of from 0.94 to 0.97 g./cc., said heating being carried out along said contact area for a time and temperature sufficient to fuse said ethylene vinyl acetate copolymer along said contact area without fusing said polyethylene.

4. A method according to claim 3 wherein said heating temperature is within the range of from 325 to 375° F.

5. An article comprising:

a receptacle well made from polyolefin material selected from the group consisting of polyethylene of 0.94 to 0.97 g./cc. density, polypropylene, and copolymers of ethylene and up to 5 weight percent of other mono-1-olefins, said receptacle well having a base with a wall around its periphery which extends upwardly therefrom, the upper portion of said wall having a lip thereon;

a closure sheet for said receptacle made of a material selected from the group consisting of normally solid ethylene vinyl acetate copolymers containing from 6 to 30 weight vinyl acetate, normally solid polyethylene of 0.91 to 0.93 g./cc. density, and normally solid rubber hydrochloride, said closure material being heat sealable to said lip under sufficient heat and pressure to form a low strength hermetic seal having a bead formed of said closure material around the periphery of said seal, said seal being further characterized by having a peel strength in a direction parallel to the longitudinal direction of said seal of from 1.1 to 5.5 lbs./in. and a peel strength in a direction normal to the longitudinal direction of said seal which is greater than said 1.1 to 5.5 lbs./in.

6. An article comprising:

a receptacle well made from normally solid polyolefin material selected from the group consisting of polyethylene of 0.94 to 0.97 g./cc. density, polypropylene, and copolymers of ethylene and up to 5 weight percent of other mono-1-olefins, said receptacle well having a base with a wall around its periphery which extends upwardly therefrom, the upper portion of said wall having a lip thereon;

a closure for said receptacle made of a sheet of normally solid ethylene vinyl acetate copolymer containing from 6 to 30 weight percent vinyl acetate said closure being sealable to said lip to form a low strength hermetic seal.

References Cited

UNITED STATES PATENTS

| 2,488,212 | 11/1949 | Lloyd | 156—306 |
|---|---|---|---|
| 2,956,723 | 10/1960 | Tritsch. | |
| 2,970,414 | 2/1961 | Rohdin | 156—306 XR |
| 3,217,871 | 11/1965 | Lee. | |
| 3,272,674 | 9/1966 | Sachs et al. | 156—306 |
| 3,379,595 | 4/1968 | Bracey | 156—306 |
| 3,192,091 | 6/1965 | Hey et al. | 156—295 |
| 3,294,621 | 12/1966 | Baird et al. | 161—247 |

FOREIGN PATENTS 980,130  1/1965  Great Britain.

OTHER REFERENCES

Belgium 651,049 as cited in chemical abstracts 64, 8418(f) (1966).

HAROLD ANSHER, Primary Examiner

W. E. HOAG, Assistant Examiner

U.S. Cl. X.R.

156—69, 247, 306; 161—25.2; 229—48, 51